Feb. 21, 1950      C. D. HILLMAN      2,498,273
TRANSIT VERTICAL CIRCLE READING DEVICE
Filed March 11, 1948      5 Sheets-Sheet 1
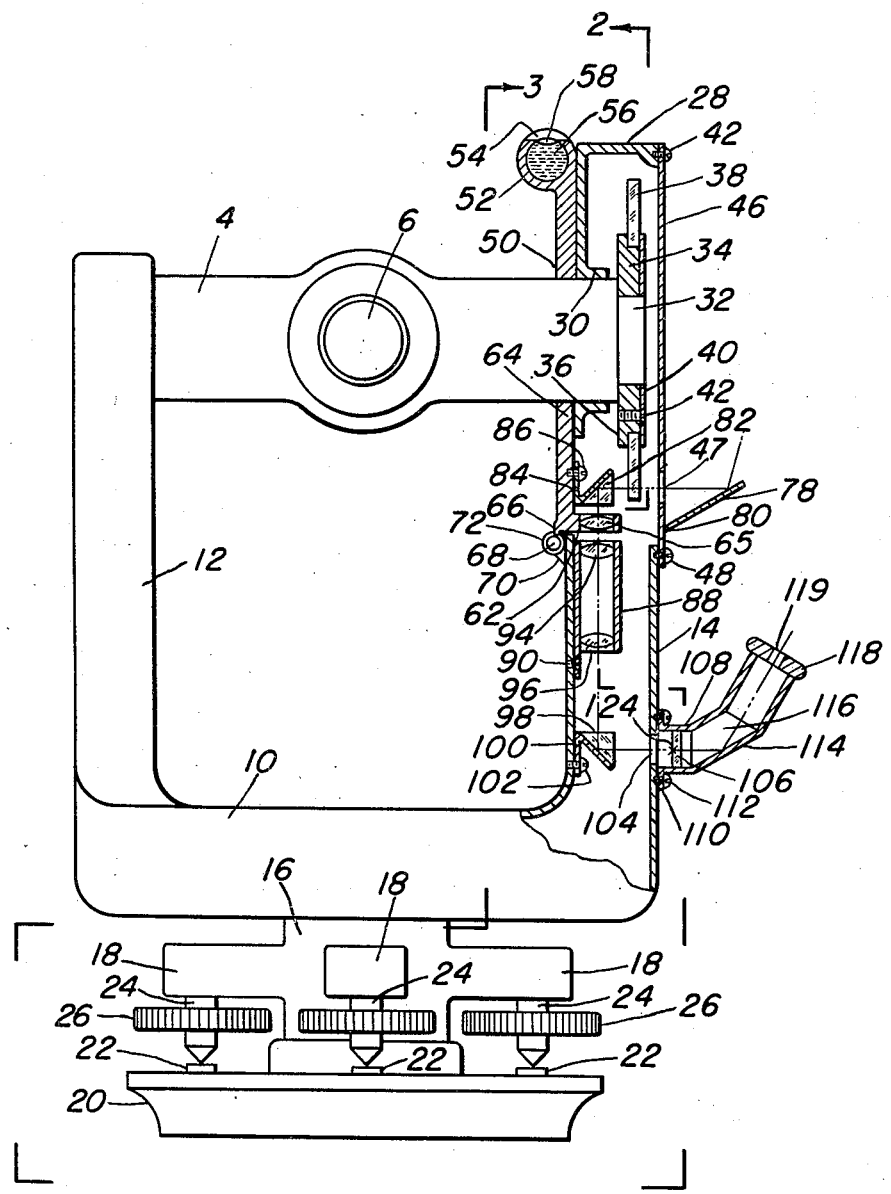
Fig. I
INVENTOR.
CONWAY D. HILLMAN Feb. 21, 1950
C. D. HILLMAN
2,498,273
TRANSIT VERTICAL CIRCLE READING DEVICE
Filed March 11, 1948
5 Sheets-Sheet 2
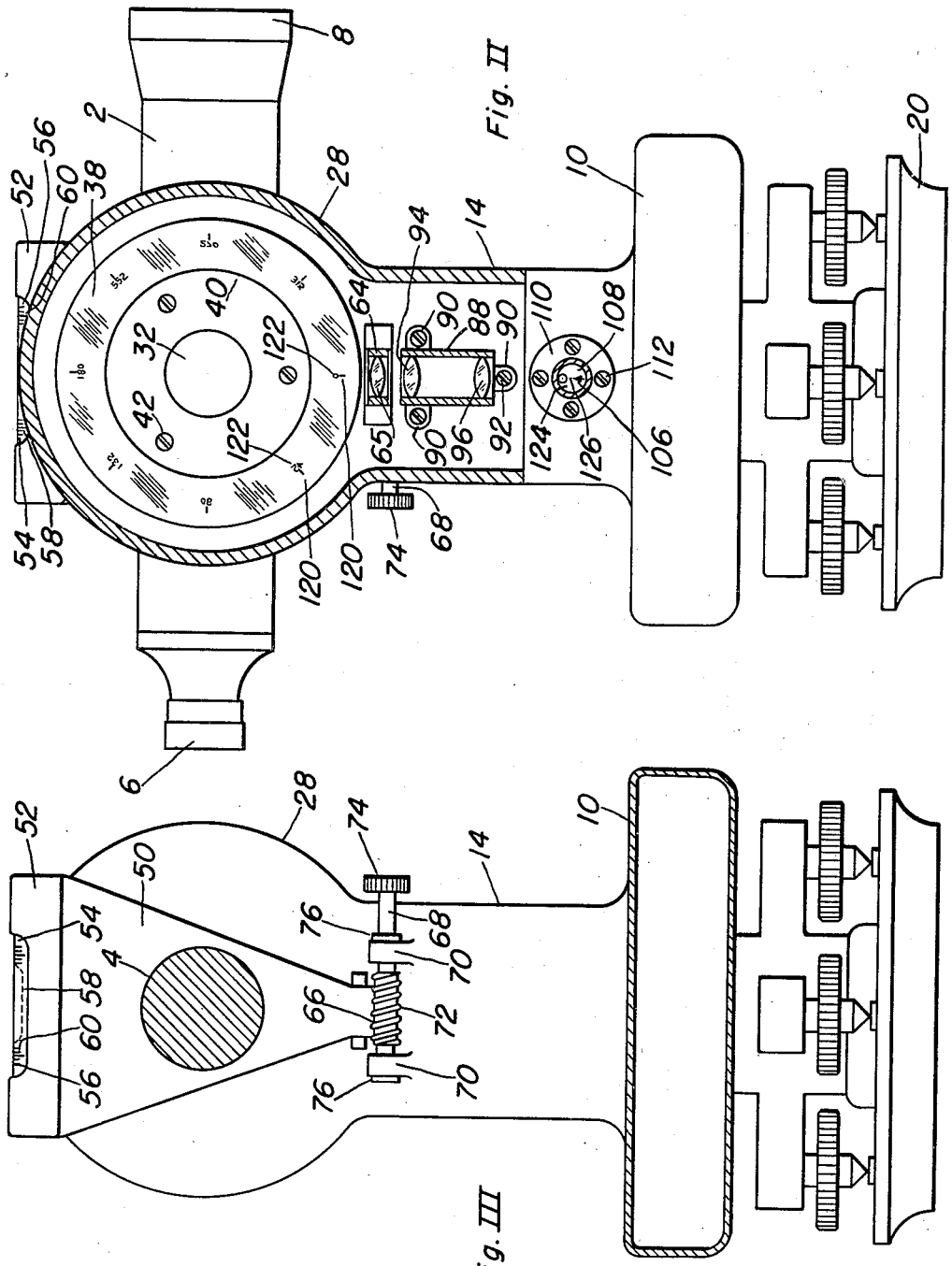
INVENTOR.
CONWAY D. HILLMAN
BY
attorney

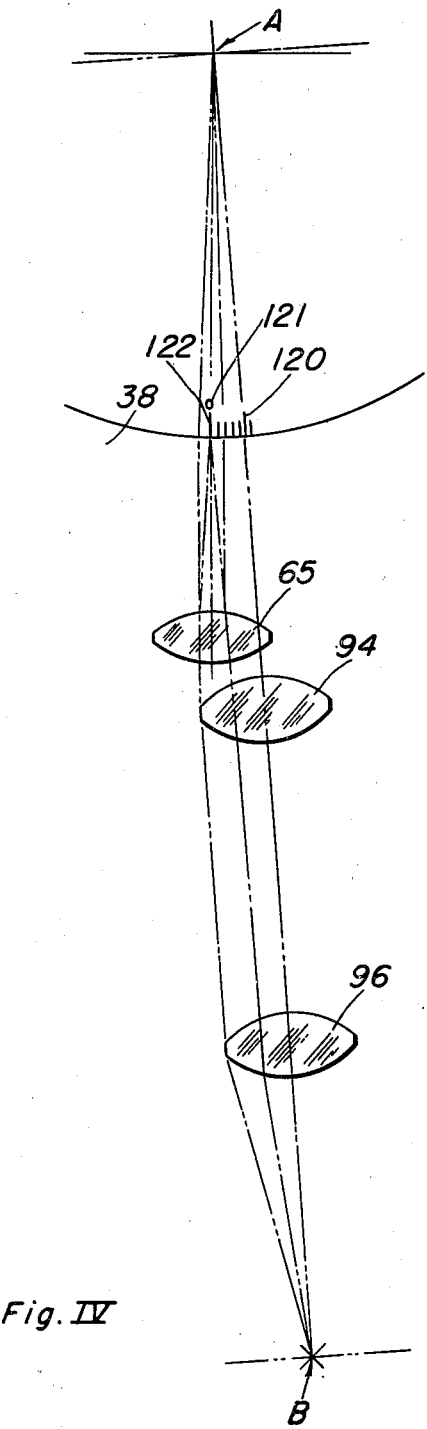
Fig. IV

Feb. 21, 1950  C. D. HILLMAN  2,498,273
TRANSIT VERTICAL CIRCLE READING DEVICE
Filed March 11, 1948  5 Sheets-Sheet 4
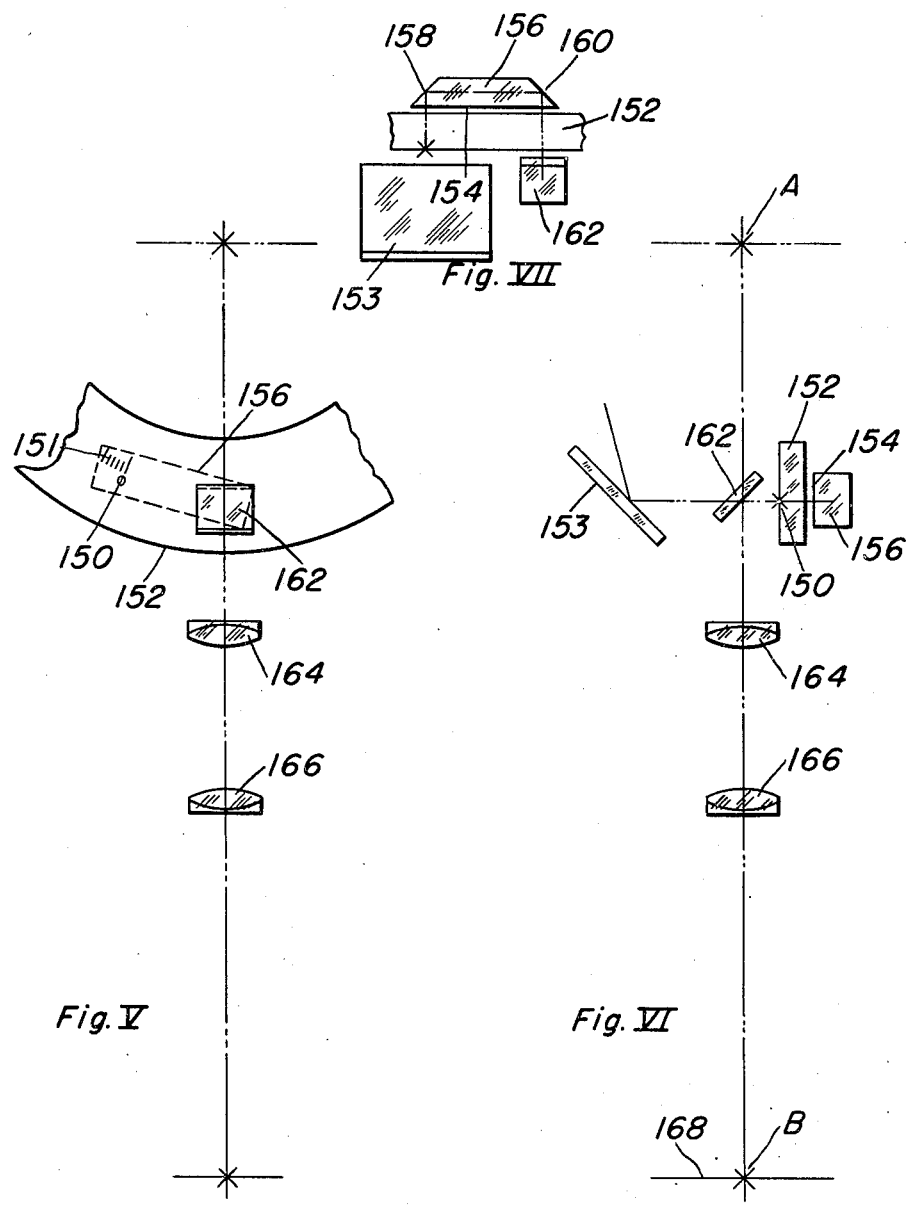
Fig. V
Fig. VI
INVENTOR.
CONWAY D. HILLMAN Feb. 21, 1950     C. D. HILLMAN     2,498,273
TRANSIT VERTICAL CIRCLE READING DEVICE
Filed March 11, 1948     5 Sheets-Sheet 5
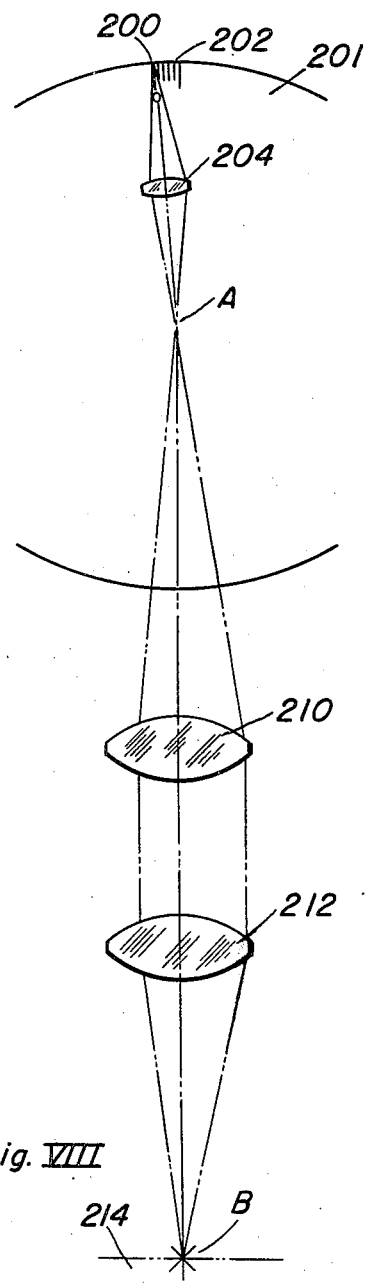
Fig. VIII
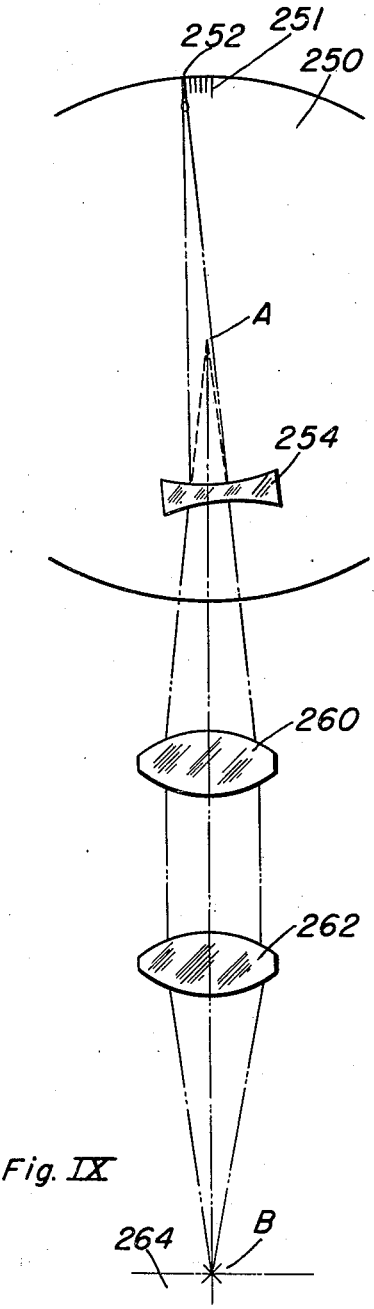
Fig. IX
*INVENTOR.*
CONWAY D. HILLMAN
BY *J. Russell Justin*
*attorney*

Patented Feb. 21, 1950

2,498,273

UNITED STATES PATENT OFFICE 2,498,273

TRANSIT VERTICAL CIRCLE READING DEVICE

Conway D. Hillman, East Orange, N. J., assignor to Keuffel & Esser Company, Hoboken, N. J., a corporation of New Jersey Application March 11, 1948, Serial No. 14,221

9 Claims. (Cl. 88—1)

This invention relates to surveying and astronomical instruments and more particularly to instruments for measuring the angle between a line or other point of reference and an object as for example the vertical angle between an object and the horizon. Common instruments of this type are the transit, the theodolite, the alidade, the level with vertical circle, and sextants with artificial horizons. This application is a continuation in part of my co-pending application Serial No. 726,693 filed February 5, 1947, now abandoned.

The invention seeks to provide in an optical system a graduated arc, an optical system mounted to move about an axis concentrically with said arc, which optical system forms an image of the arc at the axis of the arc, an index mark and a lens system whose conjugate foci are the axis of said arc and said index mark, with the result that the point at which a radius through the center of said optical system intersects the arc is imaged on said reticule.

It is an object to provide in an instrument for measuring angles a sighting device, an axis about which the sighting device pivots, a member which rotates with said sighting device having graduations on an arc the center of which is said horizontal axis, means having an index mark, a lens system having conjugate foci at said axis and at said index mark, a base line indicating device pivoted on said axis, an optical system carried with said base line indicating device having conjugate foci at said axis and at the arc of said graduations and movable in an arcuate path about said axis.

A further object of the invention is to provide a simple means for adjusting the zero point of the vertical circle so that the measurement of the altitude of an object is accurate even though the axis of the instrument is not exactly vertical.

Another object of the invention is to provide an adjustment of the type described which is easy for the user to make and in addition will provide extremely accurate adjustments.

A still further object of the invention is to provide an adjusting device of the type described which is relatively inexpensive to manufacture and which when once correctly set during the manufacturing process cannot easily get out of adjustment.

Still further objects of the invention will be apparent from the following description taken in connection with the accompanying drawings in which Fig. I is a view in elevation of a transit or theodolite with parts broken away to show the interior construction.

Fig. II is a view in vertical section along the line 2—2 of Fig. I looking in the direction of the arrows.

Fig. III is a view in section along the line 3—3 of Fig. I looking in the direction of the arrows.

Figure IV is a schematic drawing of certain parts of the instrument shown in Fig. I.

Fig. V is a schematic drawing showing a system for accomplishing the invention wherein the optical system having conjugate foci effectively at the axis and graduations is made up entirely of reflecting elements.

Fig. VI is a schematic drawing in front elevation of the embodiment of Fig. V.

Fig. VII is a schematic drawing in plan of the embodiment of Fig. V.

Fig. VIII is a schematic drawing showing a system for accomplishing the invention wherein the reading of the arcuate scale is taken at a point on the opposite side of the axis.

Fig. IX is a schematic drawing showing a system for accomplishing the invention by an arrangement as shown in Fig. VIII but using a negative lens system.

Referring to Figs. I and II the transit or theodolite is provided with a telescope element 2 of the usual type with crosshairs for viewing and sighting on distant objects. It includes an eyepiece 6 and an objective head 8. The telescope element 2 is mounted on a generally cylindrical axle 4 which is journaled in standards 12 and 14 of the base member 10 so that the telescope element 2 can be revolved about an axis which is the center line of the axle with no appreciable play or vibration.

The base 10 is mounted on a "center," not shown, which is journaled in an "outer center," also not shown, which in turn is journaled in the leveling head 16. This construction permits the base 10 together with the telescope element 2 to be revolved about the vertical axis of the "center." The leveling head is also provided with a tangent clamp and screw which are not shown for clamping the base 10 and thereby the telescope element 2 in a desired azimuth position and for accurately adjusting the telescope element 2 in such position. The leveling head 16 is fitted in the tripod plate 20 with a ball and socket joint which is not shown, and is provided with either three or four arm-line members 18 in which are threadedly engaged leveling screws 24. The pointed ends of leveling screws 24 rest on projections 22 on tripod plate 20 and are provided with thumb screws 26.

It is customary practice for the surveyor to set up his instrument on a tripod by fastening the tripod plate 20 to the head of the tripod as by a threaded engagement. The instrument is then leveled by means of the leveling screws 24 so that the axis of the "center" and accordingly of the instrument is substantially vertical. This is accompanied by checking the level of the instrument by means of one or more spirit bubbles or level vials conveniently mounted on the instrument. If the instrument is perfectly level (i. e. the axis of the "center" is truly vertical) and if the altitude scale or vertical circle is rigidly fastened to the telescope element and in proper adjustment accurate altitudes or angular positions of distant objects can be accurately read directly from the altitude scale.

It is extremely tedious and time-consuming to adjust an instrument so that the axis is perfectly vertical for all azimuth positions of the telescope 2 and base 10 before taking each altitude reading which must be done for extremely accurate work. Some mechanical and some optical adjusting devices have been used to make special corrections at any azimuth position for any slight error due to the axis of the instrument not being perfectly vertical. These devices have been relatively complicated both mechanically and optically and were relatively expensive to manufacture.

In the present invention (see Figs. I, II and III) the end of axle 4 is reduced in diameter to form the hub 32 on which is rigidly fastened as by a push fit the ring 34. The annular member 34 is provided with an annular projection 36 to receive and hold in position the vertical circle 38 which is secured in position by the annular plate 40 and screws 42. The vertical circle 38 is rigidly fastened to and concentric with the axle 4. The term "vertical circle" is commonly used in the surveying instrument art referring to an annular member provided with arcuate graduations in a vertical plane.

The axle 4 is journaled in the projecting collar 30 of the circular housing portion 28 of the standard 14. Rotatably mounted on axle 4 is the support plate 50, the upper end of which holds a bubble vial or spirit level 56 (or other base line indicating device). The lower end of plate 50 is provided with circular projection 64 and rack 66. The bubble vial 56 is not quite filled with liquid so that a meniscus type bubble 58 results. The bubble vial 56 is provided with a device to indicate the true horizontal, which device may be equally spaced indicia 60, the use of which will be explained later.

Mounted on the side of the standard 14 as by bosses 70 is shaft 68 which is provided with worm gear 72, spacing collars 76 and knurled wheel 74. The worm gear 72 engages with the teeth of the rack 66 on support plate 50. Rotation of the knurled wheel 74 causes the worm gear 72 to rotate the support plate 50 through small angles about the axis of the axle 4.

The circular housing 28 of standard 14 is provided with cover plate 46 which is fastened in position by screws 48. The cover plate 46 has an aperture 47 and has mounted on it as by hinged joint 80 a source of illumination which in this case may be a reflecting surface 78. On the support plate 50, there is mounted a prism or mirror 82 as by prism bracket 84 and screw 86 and arranged so that the vertical circle 38 is between prism 82 and aperture 47. The prism or mirror 82 moves with the support plate 50 when the latter is moved in adjusting the level vial 56. The projection 64 of support plate 50 is provided with an opening to receive lens 65 which is held in position by retaining rings or other device as may be desired.

On a vertical line through the axis of axle 4 there is mounted on the inside of standard 14 the tube-like member 88 as by fastening projecting ears 90 to the inside of standard 14 by screws 92. The holes in ears 90 are made slightly larger than the outside diameter of the screws 92 to permit a slight adjustment of the tube-like member 88. Directly below tube-like member 88 there is mounted on the inside of standard 14 prism 98 or other reflecting means as by fastening prism bracket 100 to the inside wall of standard 14 by screw 102.

On the outside of standard 14, there is mounted reticle support 108 which has a circular cross section and which is mounted directly over an aperture 104 in the side wall of standard 14. The reticle support is mounted by fastening flange member 110 to the side wall of standard 14 as by screws 112. Mounted in the reticle support 108 as by retaining rings or cement is cross hair or glass reticle 106. On the face of a glass reticle 106 there would be scribed as by etching an index mark 124 in the form of an arrow or similar device. Instead of simply an index mark, a vernier might be applied. The reticle support is slightly adjustable in position as by providing somewhat larger holes in flange member 110 than the outside diameter or holding screws 112.

As a continuation of the reticle support there is provided tubular member 114 having a square or rectangular cross section and shown as extending upward at an angle to the axis of reticle support 108. This tubular member 114 may support a prism 116. As a continuation of 114, there is provided eyepiece member 118, the axis of which makes the same angle to the axis of tubular member 114 as the axis of tubular member 114 makes to the axis of reticle support 108. The eyepiece member is provided with a small aperture 119 or can be provided with a system of lenses for magnifying the images viewed through the eyepiece 118.

In manufacture, the tube-like member 88, the prism 98 and the reticle 106 are adjusted so that the axis of tube-like member 88 and prism 98 and the index 124 on reticle 106 all fall in the same vertical plane as the axis of the axle 4 and the "center."

A metallic circle may be used in connection with this invention though as illustrated the vertical circle 38 is made of a transparent material such as glass and has etched or deposited lines 120 and numbers 122 which indicate the divisions of the circle on one side of the vertical circle. The vertical circle can be divided into degrees or for more accurate work each degree space can be divided into spaces equivalent to 20′ or finer if desired. During the manufacture of the instrument, the position of the vertical circle is adjusted so that the zero mark falls in the same vertical plane as the axis of the "center" and the axle 4 when the telescope element 2 is in a true horizontal position and the bubble 58 in bubble vial 56 is exactly centered on the indicia 60 of bubble vial 56.

If it were possible to adjust the instrument readily so that in use in the field the axis of the instrument was perfectly vertical, it would not be necessary to have the zero point adjustment which is the object of this invention. It is obvious, however, that only by painstaking effort would it be possible always to have the instrument in a truly vertical position as is shown in Fig. II when readings are to be taken. Most often the axis of the instrument is not truly vertical and to obtain an accurate reading of the vertical angle between an object and the base line which in this case is the horizon, it is necessary to readjust the zero point of the vertical circle to correct the error caused by the non-perpendicularity of the instrument.

Referring again to Fig. I, it is possible to trace a ray of light which is represented by a line consisting of a series of one dash and two dots shown falling on the reflecting surface 78. The ray of light entering aperture 47 in a horizontal path passes through the vertical circle 38 and falls upon the plano direction-changing reflecting surface of the prism 82 where it is reflected in a downward vertical direction through the lenses 65, 94 and 96 to fall on the reflecting surface of prism 98 where it is reflected in a horizontal direction through aperture 104 and through the reticle 106 to fall on the reflecting surface of prism 116 where it is reflected through eyepiece 118. It is apparent that the numbers 122 and lines 120 on the surface of the vertical circle 38 can be viewed in comparison with the index 124 on the surface of reticle 106 by looking through eyepiece 118.

If the axis of the instrument is not truly vertical and the telescope element 2 is moved to a truly horizontal position, it is obvious that the zero index of the vertical circle 38 will not fall in the same plane with the axis of the "center," the axis of the axle 4 and the index 124 of reticle 106.

In Fig. IV the principal parts of the present invention are shown schematically. Point A represents the axis of axle 4 and point B represents the index mark 124 on reticle 106. The line between A and B would then represent the vertical axis of the instrument which is here shown out of perpendicular in an exaggerated amount.

The zero mark 122 of the vertical circle 38 is shown directly under point A which is the position it would occupy if the telescope element 2 were placed in a truly horizontal position. The axial center of lens 65 is shown directly below point A and the zero mark 122 of vertical circle 38 which is the position lens 65 would occupy if support plate 50 were adjusted by turning the knurled wheel 74 so that the bubble 58 of bubble vial 56 is exactly centered on the indicia 60.

Diverging rays of light from the zero mark 122 of vertical scale 38 are shown by lines consisting of a dash and two dots falling on the surface of lens 65. After passing through lens 65 these rays of light are shown falling on lenses 94 and 96 where they are refracted to form a focal image at point B. Lens 65 is so constructed that the rays of light passing through the lens are refracted in such a manner that a virtual image of the zero mark 122 on the vertical circle 38 is formed at point A. Lenses 94 and 96 are constructed and adjusted in position so that point A is always imaged on point B. With this construction, it is apparent that within the limits of the construction the virtual image of the zero mark on the vertical circle 38 will always be imaged on point B when the telescope element 2 is in a true horizontal position and when support plate 50 together with lens 65 has been adjusted so that bubble 58 is centered on the indicia 60 of bubble vial 56. It is also apparent that the combination of lenses 65, 94 and 96 will bring the image of the zero mark of the vertical circle 38 to a focus at point B which is the surface of reticle 106 containing the index mark 124 for all normal positions of lens 65. It further follows that the image 126 of the zero mark 122 of vertical circle 38 will appear in juxtaposition with or superposed on the index 124 on reticle 106. Even though the vertical axis of the instrument is not exactly perpendicular, the zero mark of the vertical circle 38 is viewed in juxtaposition with the index 124 on reticle 106 when the telescope element or sighting device 2 is horizontal. As the telescope element 2 is rotated about the axis of axle 4 the amount of rotation in degrees from horizontal (or other base line) can be read through the eyepiece 118 by reading the degrees denoted by lines 120 and numbers 121 opposite the index 124.

The construction described provides one lens 65 or lens system with conjugate foci at A and 120 to form a virtual image of lines 120 and numbers 122 at the axis A of axle 4. To obtain this condition, it is necessary that the focal length of the lens 65 agree with the formula, $$\frac{1}{f} = \frac{1}{a} + \frac{1}{v}$$

where $f$ is the focal length, $a$ is the distance from the arcuate scale 120 to the nodal point of the lens 65 and $v$ is the distance from the axis A to the second nodal point of the lens 65. This distance $v$ is taken as negative because the image is virtual. A second lens system of lenses 94 and 96 has conjugate foci at A and B and brings rays of light passing through lens 65 to focus at the surface of reticle 106 on which is placed index 124. While at least one lens is required to perform the function of lens 65, the same desired result could be accomplished with a plurality of lenses or if prism 82 were above the axis of the axle 4, lens 65 would be a negative lens. Similarly, while the construction described involves the use of two lenses, 94 and 96, to bring the rays of light passing through lens 65 to a focus at the surface of reticle 106, this result could be obtained by the use of one lens or it could be obtained by the use of more than two lenses. If one lens is used in place of lenses 94 and 96, that lens is so constructed and positioned that the axis A of axle 4 is imaged on the index 124 on reticle 106.

In the schematic drawing in Fig. IV the action of prisms 82, 98 and 116 has been omitted for purposes of simplicity, but it is obvious that the inclusion of such prisms or other reflecting surface in the paths of light will not affect the principle of operation. It is further apparent that the image of the lines 120 and numbers 121 on vertical circle 38 and the index 124 of reticle 106 can be viewed by any form of optical system which provides a convenient method of viewing these points and that if desired, the optical system can include magnification. Eyepiece 118 can be located in any convenient position.

Referring to Figs. V, VI and VII, light reflected from the mirror 153 or from any form of source such as a light bulb passes thru the vertical transparent circle 152 to illuminate the scale 151. The light then goes through the face 154 of the reversing prism 156 to the reflecting surface 158 which reflects it to the reflecting surface 160 which in turn reflects it through another portion of the vertical circle 152 at which the graduations of the scale 151 are out of focus, thence to the mirror 162, which reflects it to the lenses 164 and 166. The lenses 164 and 166 image the portion of the scale 151 adjacent the mirror 153 on the reticle 168 through the optical path as described. The length of the optical path along the centerline of the optical system from the said portion of the scale 151 through the prism 156 and the circle 152 to the mirror 162 equals the distance from the telescope axle A to the mirror 162. Therefore the optical system which in this embodiment consists of the reversing prism 156 and the reflector 162 forms a virtual image of the scale 151 at the point A on the axis of the telescope axle.

The reversing prism 156 and mirror 162 are secured to a support plate similar to support plate 50 in Fig. I to which a bubble vial such as bubble vial 56 in Fig. I is also secured. The position of the zero mark 150 of the scale 151 is so set in manufacture and original adjustment so that when the telescope is in a true horizontal position and when the support plate, bearing reversing prism 156, mirror 162 and a level vial, is adjusted so that the bubble is centered on the indicia of the level vial, the virtual image of the zero mark 150 will be imaged at point B on the reticle 168. This construction is equivalent to the construction shown in Fig. IV, but the zero mark 150 is not directly under the axle A of the telescope axle.

The prism 156 may be replaced by a system of reflectors or the reflector 162 may be replaced by a prism as desired.

Referring to Fig. VIII, the scale 202 on the vertical circle 201 is imaged by a lens 204 or a system of lenses to a point A on the horizontal axis about which the telescope rotates. In this embodiment the image formed at point A is a real image. In adjusted position the zero mark 200 is imaged at point A which in turn is imaged by the lenses 210 and 212 or by a single lens to point B on the reticle 214. This embodiment is equivalent to the embodiment shown in Fig. IV.

In Fig. IX another embodiment is shown in which a negative lens 254 forms a virtual image of scale 251 on circle 250 at the point A on the horizontal axis of the telescope. In adjusted position the vertical image of the scale 251 will be imaged by the lenses 260 and 262 on the reticle 264 so that the zero point 252 of scale 251 coincides with point B or an index mark on reticle 264.

With instruments embodying the present invention, the instrument is set up in the field as previously described and the axis of the instrument made reasonably perpendicular by means of the adjusting screws 24 the same as a conventional transit but prior to taking readings of the elevation of any object, the telescope element 2 is adjusted to the desired azimuth position and by means of knurled wheel 74 the bubble vial 56 is adjusted to a true horizontal position so that bubble 58 is centered on indicia 60. This adjustment compensates for any non-perpendicularity of the axis of the instrument and if the telescope element 2 were placed in a true horizontal position, the zero mark of vertical circle 38 would appear in juxtaposition to the index 124 on reticle 106. The object is then sighted through the telescope element 2 by rotating the telescope the desired angular amount about the axis of axle 4 and the elevation or vertical angle of the object is read by viewing the image 126 of lines 120 of vertical circle 38 in juxtaposition to the index 124 of reticle 106 through eyepiece 118. To measure the elevation of additional objects the same procedure is followed. Before and if desired after each reading the bubble vial 56 is adjusted to re-establish the horizontal base line by means of knurled wheel 74. This setting automatically compensates for the non-perpendicularity of the axis of the instrument in the vertical plane in which the reading is taken so that readings of elevations through eyepiece 118 are accurate readings.

Many variations of the present invention will be apparent to those skilled in the art and it is not intended that the invention shall be limited to the embodiments described herein but shall be limited only to the extent of the appended claims.

I claim:

1. In an optical instrument, a member having arcuate graduations in a vertical plane said graduations having their center on a horizontal axis of said optical instrument, means carrying an index mark, a first optical system generally in line with and having conjugate foci at the horizontal axis in the plane of said arcuate graduations and at said index mark, and a second optical system mounted to move about said axis concentrically with said graduations forming an image of said graduations at the horizontal axis in the plane of said arcuate graduations, said first and second optical systems cooperating to image some of the arcuate graduations against said index mark.

2. In an instrument for measuring angles, a sighting device provided with means permitting angular rotation about an axle, the centerline of said axle forming an axis about which the sighting device pivots, a member which rotates with said sighting device having graduations in a plane perpendicular to said axis on an arc the center of which is on said axis, means having an index mark, a first optical system having conjugate foci at said axis and at said index mark, a base line indicating device pivoted on said axis, and a second optical system carried with said base line indicating device and movable in an arcuate path about said axis therewith forming an image at said axis of said graduations so that when said base line indicating device indicates a horizontal base line the first and second optical systems will cooperate to image some of the graduations against the index mark which will indicate with respect to the graduations the true elevation of the sighting device.

3. In an instrument for measuring angles of elevation a sighting device provided with means permitting rotation about an axle, the centerline of said axle forming a horizontal axis about which the sighting device pivots, a member which rotates with said sighting device having graduations in a vertical plane on an arc the center of which is on said horizontal axis, a reticle having an index mark, a first optical system having conjugate foci at said axis and at said index mark, a horizontal base line indicating device pivoted on said axis, and a second optical system carried with said base line indicating device and movable in an arcuate path about said axis therewith forming an image at said axis of said graduations so that when said base line indicating device indicates a horizontal base line the first and second optical systems will cooperate to image some of the graduations on said reticle and the index mark will indicate with respect to the graduations the true elevation of the sighting device.

4. In an instrument for measuring angles of elevation a telescope with a cross wire to indicate a line of sight, instrument standards with bearings for supporting said telescope, and an axle attached to said telescope supported in the bearings to pivot the telescope about a horizontal axis, an annular member having graduations on one side thereof which rotates with said telescope and the center of which is on said horizontal axis, a reticle mounted on said instrument standards having an index mark, a first optical system including a plano direction-changing reflecting surface mounted on said instrument standards generally in line with and having conjugate foci at said axis and at said index mark, a bubble vial level-indicating device pivoted on said axis, and a second optical system including a second plano direction-changing reflecting surface carried with said level-indicating device and movable in an arcuate path about said axis therewith forming an image at said axis of said graduations so that when said level indicating device indicates level the first and second optical systems will cooperate to image some of the graduations on said reticle and the index mark will indicate with respect to the graduations the true elevation of the telescope.

5. In an instrument for measuring angles of elevation an instrument base with a hollow generally closed vertical standard provided with bearings, a telescope with a cross wire to indicate a line of sight provided with an axle resting in said bearings, the center line of said axle forming a horizontal axis about which the telescope pivots, a transparent annular member having graduations on one side thereof which rotates with said telescope within said hollow standard on an arc the center of which is on said horizontal axis means for illuminating said graduations, a reticle mounted on said standard having an index mark, a first optical system including a plano direction-changing reflecting surface mounted within said hollow standard having conjugate foci at said horizontal axis and at said index mark, a bubble vial level indicating device pivoted on said horizontal axis, and a second optical system including a second plano direction changing reflecting surface within said hollow standard carried with said level indicating device and movable in an arcuate path about said horizontal axis therewith forming an image of said graduations at said horizontal axis so that when said level indicating device indicates level the first and second optical systems will cooperate to image some of the graduations on said reticle and the index mark will indicate with respect to the graduations the true elevation of the telescope.

6. In a theodolite a sighting telescope provided with means permitting rotation about an axle the centerline of which forms a substantially horizontal axis about which the telescope pivots, a member which rotates with said telescope having graduations on an arc concentric with said horizontal axis a reticle having an index mark, a first lens system having conjugate foci at said axis and at said index mark, a level indicating device pivoted on said axis, and a second lens system carried with said level indicating device and movable between said first lens system and said axis in an arcuate path about said axis with said level indicating device forming a virtual image at said axis of said graduations so that when said level indicating device indicates level the first and second optical systems will cooperate to image some of the graduations on said reticle and the index mark will indicate with respect to the graduations the true elevation of the telescope.

7. In a theodolite a sighting telescope provided with means permitting rotation about an axle the centerline of which forms a substantially horizontal axis about which the telescope pivots, a member which rotates with said telescope having graduations on an arc concentric with said horizontal axis a reticle having an index mark, a lens system having conjugate foci at said axis and at said index mark, a level indicating device pivoted on said axis, and a system of plano direction changing reflecting surfaces carried with said level indicating device and movable in an arcuate path about said axis therewith forming a virtual image at said axis of said graduations so that when said level indicating device indicates level the first and second optical systems will cooperate to image some of the graduations on said reticle and the index mark will indicate with respect to the graduations the true elevation of the telescope.

8. In a theodolite a sighting telescope provided with means permitting rotation about an axle, the centerline of which forms a horizontal axis about which the telescope pivots, a member which rotates with said telescope having graduations on an arc concentric with said horizontal axis a reticle having an index mark, a first lens system having conjugate foci at said axis and at said index mark, a level indicating device pivoted on said axis, and a second lens system carried with said level indicating device and movable in an arcuate path about said axis therewith forming an image at said axis of said graduations from a point on the opposite side of said axis from said first lens system so that when said level indicating device indicates level the first and second optical systems will cooperate to image some of the graduations on said reticle and the index mark will indicate with respect to the graduations the true elevation of the telescope.

9. In a theodolite a sighting telescope provided with means permitting angular rotation about an axle, the centerline of said axle forming a substantially horizontal axis about which the telescope pivots, a member which rotates with said telescope having graduations on an arc concentric with said axis, a reticle having an index mark, a first optical system generally in line with and having conjugate foci at said axis and at said index mark, a level indicating device pivoted on said axis, and a second optical system carried with said level indicating device and movable in an arcuate path about said axis therewith forming an image at said axis of said graduations so that when said level indicating device indicates level the first and second optical systems will cooperate to image some of the graduations on said reticle and the index mark will indicate with respect to the graduations the true elevation of the telescope.

CONWAY D. HILLMAN.

REFERENCES CITED

The following references are of record in the file of this patent:

UNITED STATES PATENTS

| Number | Name | Date |
| --- | --- | --- |
| 1,449,527 | Mackensen | Mar. 27, 1923 |

FOREIGN PATENTS

| Number | Country | Date |
| --- | --- | --- |
| 541,948 | Great Britain | Dec. 18, 1941 |